United States Patent [19]
Takahashi

[11] Patent Number: 5,663,937
[45] Date of Patent: Sep. 2, 1997

[54] MAGNETIC HEAD SLIDER FOR SUPPORTING A RECESSED MAGNETIC HEAD AND HAVING A SIDE RECESS TO PREVENT INADVERTENT CONTACT WITH DISC SURFACE AT RIM

[75] Inventor: Tomoyuki Takahashi, Miyagi, Japan

[73] Assignee: Sony Corporation, Tokyo, Japan

[21] Appl. No.: 558,726

[22] Filed: Nov. 16, 1995

[30]     Foreign Application Priority Data

Nov. 20, 1994  [JP]  Japan ................... 6-310022

[51] Int. Cl.⁶ .................................................. G11B 11/00
[52] U.S. Cl. ......................... 369/83; 360/114; 360/59
[58] Field of Search ............................ 369/13, 127, 146, 369/244, 75.2, 77.1, 77.2, 78; 360/114, 59, 104, 103

[56]          References Cited

U.S. PATENT DOCUMENTS

| | | | |
|---|---|---|---|
| 4,759,119 | 7/1988 | Noguchi et al. | 29/603 |
| 5,126,984 | 6/1992 | Kawai | 369/13 |
| 5,199,090 | 3/1993 | Bell | 385/33 |
| 5,237,475 | 8/1993 | Kazama et al. | 360/104 |
| 5,305,294 | 4/1994 | Kime et al. | 369/13 |
| 5,455,809 | 10/1995 | Naraoka et al. | 369/13 |
| 5,467,237 | 11/1995 | Takahashi | 360/114 |
| 5,483,504 | 1/1996 | Horita et al. | 369/13 |

FOREIGN PATENT DOCUMENTS

| | | |
|---|---|---|
| 0524629 A1 | 1/1993 | European Pat. Off. . |
| 0566998 A2 | 10/1993 | European Pat. Off. . |
| 0609024 A2 | 8/1994 | European Pat. Off. . |
| 0676745 A1 | 10/1995 | European Pat. Off. . |

*Primary Examiner*—Ali Neyzari
*Attorney, Agent, or Firm*—Limbach & Limbach L.L.P.

[57]          ABSTRACT

A magnetic head device for magneto-optical recording includes a magnetic head element having a magnetic core and a bobbin carrying a coil, a slide contact member carrying the magnetic head element and having a slide contact portion having sliding contact with a magneto-optical disc, and a head support supported for rotational deflection about a first axis by a movable base movably supported radially of the magneto-optical disc and carrying the slide contact member for rotational deflection about a second axis at its distal end. The first and second axes are parallel to both a recording surface of the magneto-optical disc and a direction of radial travel of the slide contact member over the magneto-optical disc. The slide contact member has the slide contact portion on its one end associated with the direction of rotation of the magneto-optical disc. A first slide contact clearance is formed on the outer periphery on the distal end of the magnetic head element facing the magneto-optical disc and a second slide contact clearance is formed on its one lateral side towards the outer periphery of the magneto-optical disc when the slide contact member is moved on the magneto-optical disc.

19 Claims, 7 Drawing Sheets

MAGNETIC HEAD SLIDER FOR SUPPORTING A RECESSED MAGNETIC HEAD AND HAVING A SIDE RECESS TO PREVENT INADVERTENT CONTACT WITH DISC SURFACE AT RIM

BACKGROUND OF THE INVENTION

This invention relates to a magnetic head for magneto-optical recording having a slide contact member configured for being moved radially of a magneto-optical disc in sliding contact therewith for recording information signals in a magneto-optical recording and/or reproducing apparatus.

There has hitherto been employed a magneto-optical disc recording and/or reproducing apparatus employing a magneto-optical disc having a magneto-optical recording layer formed by a perpendicular recording film on a light-transmitting, transparent substrate.

With the magneto-optical disc recording/reproducing apparatus, an optical pickup device for radiating a light beam for illuminating the magneto-optical recording layer of a magneto-optical disc is arranged facing one of the major surfaces of the magneto-optical disc rotated by a disc rotation mechanism, while a magnetic head device for applying an external magnetic field to the magneto-optical recording layer is provided facing the opposite major surface of the magneto-optical disc. Thus the optical pickup device and the magnetic head device are arranged with the magneto-optical disc in-between.

With the magneto-optical disc recording/reproducing apparatus, a magnetic field whose direction is modulated in accordance with recording information signals is applied by a magnetic head device on the magneto-optical recording layer of the rotating magneto-optical disc, at the same time as a light beam outgoing from the optical pickup device is radiated on the magneto-optical recording layer. The portion of the magneto-optical recording layer which has lost its coercivity by being illuminated with the light beam so as to be thereby heated to higher than the Curie temperature is magnetized in accordance with the direction of the magnetic field applied by the magnetic head device. The light beam is relatively moved with rotation of the magneto-optical disc so that the above portion of the magneto-optical recording layer is no longer illuminated with the light beam and hence its temperature becomes lower than the Curie temperature. The information signals are recorded by fixation of the direction of magnetization.

With the conventional magneto-optical disc recording/reproducing apparatus, the magnetic head is caused to face the magneto-optical disc without being contacted therewith during recording of the information signals with a view to prohibiting the magneto-optical disc from becoming damaged by sliding contact with a metal core, such as a ferrite core, constituting the magnetic head.

Thus the conventional magnetic head device is provided with an electro-magnetic control mechanism for displacing the magnetic head in following up with surface deviations of the magneto-optical disc for holding the magnetic head at a pre-set distance from the magneto-optical disc without being contacted therewith even if a surface deviation has been incurred during rotation of the magneto-optical disc due to warping or thickness fluctuations in the disc.

With the magnetic head device provided with the electro-magnetic control mechanism for displacing the magnetic head in following up with surface deviations of the magneto-optical disc for holding the magnetic head at a pre-set distance from the magneto-optical disc, the electro-magnetic control mechanism needs to be driven by electric power, thus increasing the power consumption. In addition, a detection mechanism for detecting the distance between the magnetic head and the magneto-optical disc is required, thus complicating the mechanism for controlling the magnetic head device. In addition, the recording/reproducing apparatus becomes complex in construction thus rendering it extremely difficult to reduce the size and thickness of the apparatus itself.

Thus a magneto-optical disc recording/reproducing apparatus has been proposed in which a magnetic head device adapted for being slidingly contacted with the magneto-optical disc liable to produce surface deviations during rotation is provided in place of the magnetic head device adapted for controlling the magnetic head so as to be at a pre-set distance from magneto-optical disc.

With the magnetic head device employed in this sort of the magneto-optical recording and/or reproducing apparatus, a magnetic head element is mounted on a slide contact member having a sliding contact with the major surface of the rotated magneto-optical disc for maintaining a pre-set distance between the magnetic head element and the magneto-optical disc.

The magnetic head element, mounted on the slide contact member, has a magnetic core formed of a hard material, such as ferrite. If this magnetic core is directly contacted with the magneto-optical disc, the magneto-optical disc is damaged easily. Thus the slide contact member carrying the magnetic head element has a slide contact portion on its surface having a sliding contact with the magneto-optical disc. The slide contact portion is protruded from the distal end of the magnetic head element so that only this slide contact portion is contacted with the magneto-optical disc while the magnetic head element is not contacted with the magneto-optical disc. A magneto-optical disc 1 having sliding contact with the slide contact member carrying the magnetic head element has a magneto-optical recording layer 3, a reflective film 4 formed of a metal material such as aluminum and a protective film 5 formed of a UV curable resin, layered in this sequence, on one of the major surfaces of a disc substrate 2 formed by molding a light-transmitting transparent polycarbonate resin, as shown in FIG. 1. The magneto-optical recording layer 3 is formed by a first dielectric layer, a recording magnetic layer and a second dielectric layer.

The protective layer 5 is provided for prohibiting the magneto-optical recording layer 3 or the reflective layer 4 from being mechanically damaged and from becoming eroded by moisture or oxygen. The moisture or oxygen, attacking the magneto-optical recording layer 3 or the reflective layer 4, are intruded at the outer peripheral edge of the magneto-optical disc. Thus the protective film 5 is increased in film thickness at an outer peripheral edge 1a for positively covering the magneto-optical recording layer or the reflective layer 4.

If the outer peripheral edge of the protective film 5 is increased in film thickness, the magneto-optical disc is increased in thickness at the outer peripheral edge more significantly than at the inner peripheral edge, such that the major disc surface slidingly contacted by the slide contact member of the magnetic head device presents an inclined surface section 5a inclined from the inner periphery towards the outer periphery of the disc. Thus, when the slide contact member is moved towards the outer periphery of the magneto-optical disc 1, the portions of the magnetic head element other than the slide contact portion are contacted with the major surface of the magneto-optical disc 1, while the slide contact portion is spaced apart from the major surface of the magneto-optical disc 1. If the slide contact portion of the slide contact member is spaced apart from the major surface of the magneto-optical disc 1, the distance between the magnetic head element and the magneto-optical recording layer 3 cannot be maintained constant, such that correct recording of information signals becomes infeasible.

In addition, if the slide contact portion of the slide contact member is spaced apart from the major surface of the magneto-optical disc, thee is a risk that part of the magnetic head element be contacted with the magneto-optical disc 1 thus damaging the protective layer 5. If the protective layer 5 is damaged, the magneto-optical disc 1 tends to be attacked by water or oxygen, such that the magneto-optical recording layer 3 or the reflective layer 4 cannot be protected sufficiently.

OBJECTS AND SUMMARY OF THE INVENTION

It is therefore an object of the present invention to provide a magnetic head device for magneto-optical recording which renders it possible to assure positive sliding contact of the slide contact member with the magneto-optical disc across the inner and outer rims of the disc and to maintain a pre-set constant distance between the magnetic head element and the magneto-optical recording layer 3 for enabling correct recording of information signals.

It is another object of the present invention to provide a magnetic head device for magneto-optical recording whereby protection of the magneto-optical disc may be achieved.

According to the present invention, there is provided a magnetic head device for magneto-optical recording including a magnetic head element having a magnetic core and a bobbin carrying a coil, a slide contact member carrying the magnetic head element and having a slide contact portion having sliding contact with a magneto-optical disc, and a head support which is supported for rotational deflection about a first axis by a movable base movably supported radially of the magneto-optical disc and which has the slide contact member for rotation deflection about a second axis at a distal end thereof. The first and second axes are parallel to both a recording surface of the magneto-optical disc and a direction of radial travel of the slide contact member over the magneto-optical disc. The slide contact member has the slide contact portion on one end thereof associated with the direction of rotation of the magneto-optical disc. A first slide contact clearance is formed on the outer periphery on the distal end of the magnetic head element facing the magneto-optical disc and a second slide contact clearance is formed on one lateral side thereof towards the outer periphery of the magneto-optical disc when the slide contact member is moved on the magneto-optical disc.

According to the present invention, since the first and second slide contact clearances are formed on the slide contact portion having a sliding contact with the magneto-optical disc, the slide contact member may be positively contacted with sliding contact with the magneto-optical disc across the inner and outer rims of the disc capable of recording information signals as the distance between the magnetic head element and the magneto-optical disc is maintained substantially at a pre-set constant value. The information signals may be recorded positively on the magneto-optical disc without damaging the disc.

With the present magnetic head device, if the slide contact member supported for rotational deflection by the distal end of the head support is rotationally deflected with the slide contact portion being in sliding contact with the magneto-optical disc, the sliding contact of the magnetic head element and the outer peripheral edge thereof with the magneto-optical disc is controlled by the first slide contact clearance for positively prohibiting the magneto-optical disc from being damaged by sliding contact with the magnetic head element.

When the slide contact member has been moved as far as the outer periphery of the magneto-optical disc, the second slide contact clearance is positioned on the outer peripheral side of the magneto-optical disc, so that the slide contact member is inhibited from being in sliding contact with the thickened outer peripheral portion of the magneto-optical disc for prohibiting the slide contact portion from being floated from the disc. Thus it becomes possible for the slide contact member to have a positive sliding contact with the disc in an area across the inner and outer rims thereof capable of recording information signals, such that a substantially constant distance may be maintained between the magnetic head element and the disc for enabling positive recording of information signals on the disc.

DETAILED DESCRIPTION OF THE PREFERRED EMBODIMENTS

Figure 1:
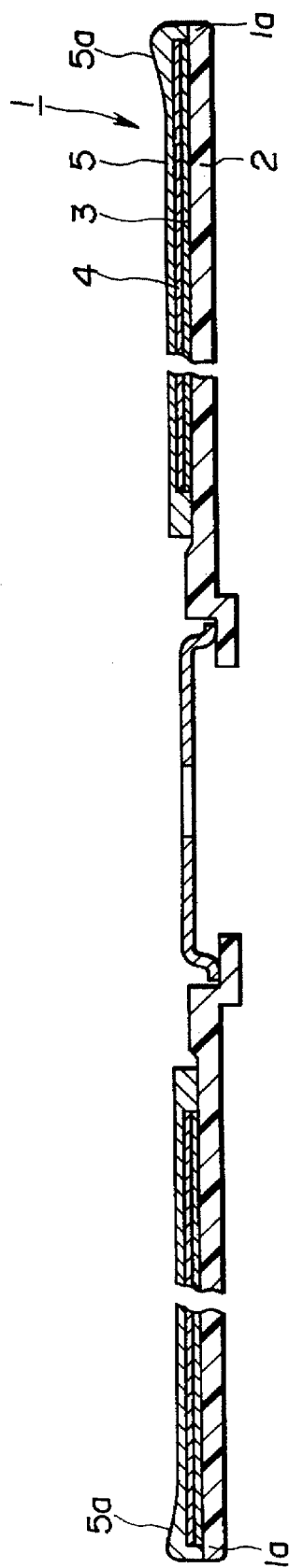
FIG. 1 is a cross-sectional view showing a magneto-optical disc employed in conjunction with a magnetic recording device according to the present invention.

Referring to the drawings, preferred embodiments of the present invention will be explained in detail.

Figure 2:
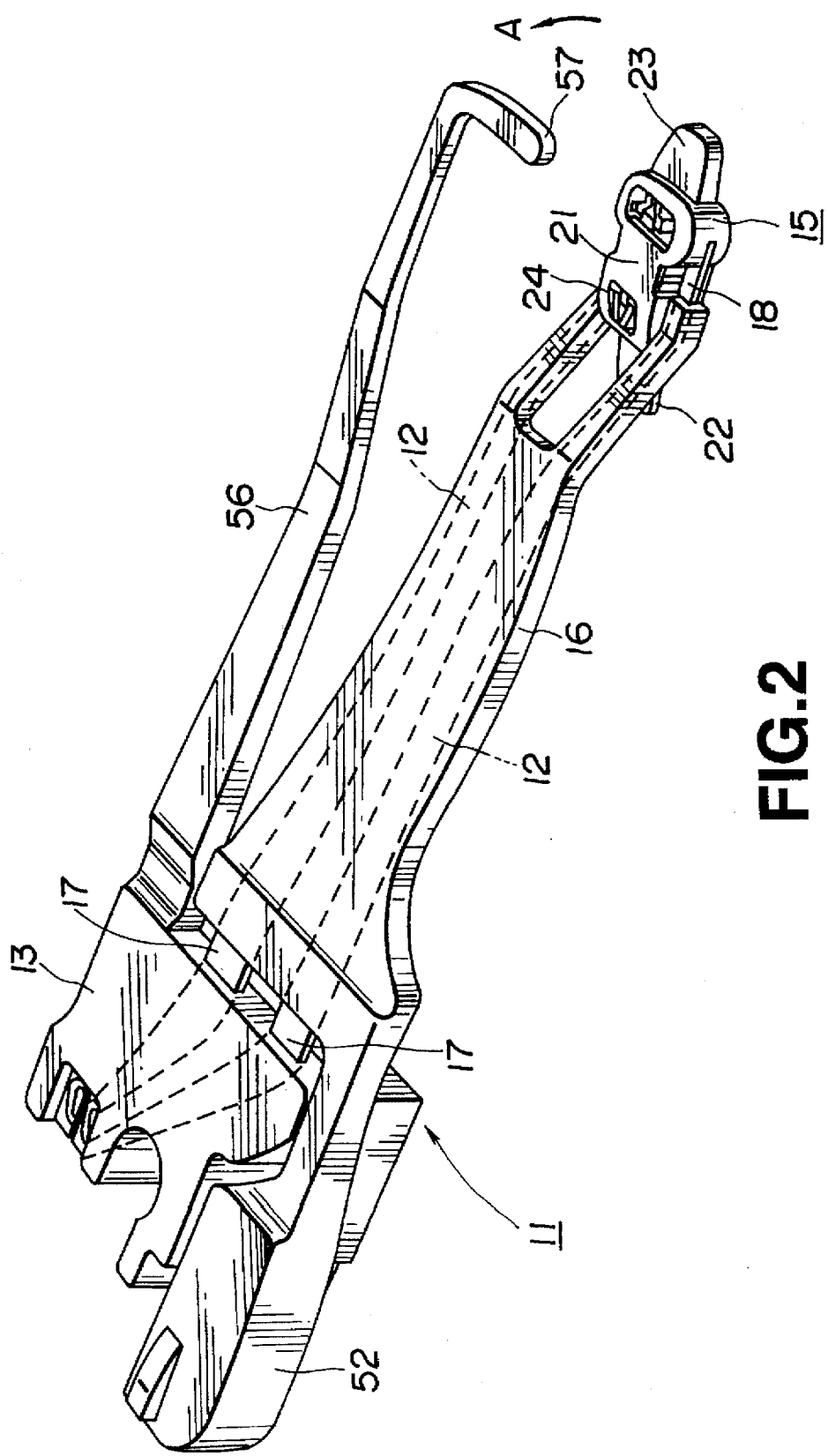
FIG. 2 is a perspective view of the magnetic head according to the present invention, as seen from above.
Figure 3:
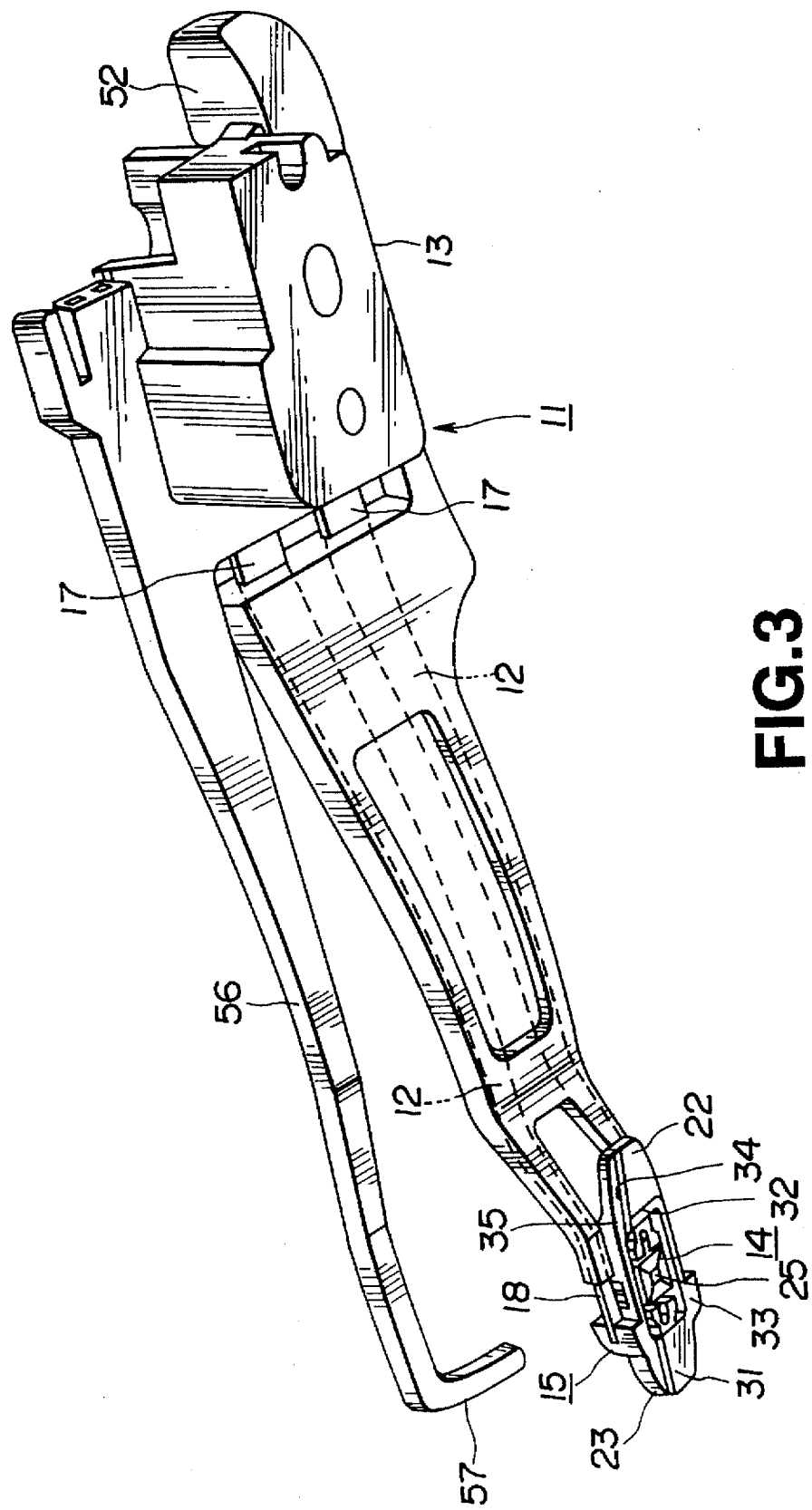
FIG. 3 is a perspective view showing a magnetic head device according to the present invention, looking from the slide contact surface for the magneto-optical disc.

A magnetic head device 11 according to the present invention includes a pair of elongated electrically conductive elastic members 12, 12 arranged substantially parallel to each other, as shown in FIGS. 2 and 3. These elastic members 12, 12 are formed by punching thin plates of metal, such as phosphor bronze or BeCu exhibiting electrical conductivity.

The proximal ends of the elastic members 12, 12 are integrally molded with a stationary portion 13 by molding a synthetic resin material, as shown in FIGS. 2 and 3. The stationary portion 13 is used for mounting the magnetic head device 11 within the magneto-optical recording/reproducing apparatus. The distal ends of the elastic members 12, 12 are integrally formed with a slide contact member 15 by molding a synthetic resin material. The slide contact member 15 has mounted thereon a magnetic head element 14 made up of a magnetic core and a coil. Between the proximal ends of the elastic members 12, 12 provided with the stationary portion 13 and the distal ends thereof provided with the slide contact member 15, a head support 16 is integrally molded by molding the synthetic resin material.

The head support 16, molded from the synthetic resin material, is integrally provided partway on the elastic members 12, 12 so that the elastic members 12, 12 are partially exposed to outside between the head support 16 and the stationary portion 13 and also so that the elastic members 12, 12 are partially exposed to outside between the head support 16 and slide contact member 15. The portions of the elastic members 12, 12 exposed to outside between the stationary portion 13 and the head support 16 operate as first resilient flexible portions 17, 17 acting as the center of rotation when the head support 16 inclusive of the slide contact member 15 is moved in a direction towards and away from the magneto-optical disc. The portions of the elastic members 12, 12 exposed to outside between the head support 16 and the slide contact member 15 operate as second resilient flexible portions 18, 18 which are flexibly deflected in order to permit wobbling deflections of the slide contact member 15 carrying the magnetic head element 14 so as to follow the surface deviations of the magneto-optical disc.

The portions of the elastic members 12, 12 constituting the second resilient flexible portions 18, 18 are narrower in width than the portions thereof constituting the first resilient flexible portions 17, 17 so that these portions 18, 18 may be resiliently flexed more readily than the first resilient flexible portions 17, 17. That is, since the first resilient flexible portions 17, 17 bias the head support so that the slide contact member 15 will be slidingly contacted with the rotated magneto-optical disc with a pre-set sliding contact pressure, it is necessary for the first resilient flexible portions 17, 17 to afford to the head support 16 a force of bias sufficient to prohibit the slide contact member 15 from being floated from the magneto-optical disc even in case the rotated magneto-optical disc is subjected to surface deviations. On the other hand, the second resilient flexible members 18, 18 perform the role of following up with rotation of the magneto-optical disc for maintaining a constant pre-set sliding contact attitude of the slide contact member 15 even in case the magneto-optical disc is subjected to surface deviations with the slide contact member 15 remaining slidingly contacted with the magneto-optical disc. Thus the spring force of the second resilient flexible members 18, 18 is selected to be smaller than that of the first resilient flexible portions 17, 17.

Since the slide contact member 15 is slidingly contacted with the rotating magneto-optical disc, it is preferably superior in sliding performance and abrasion resistance and lightweight. In addition, it is preferably formed of a material which achieves high dimensional accuracy on molding. Thus the material of the slide contact member 15 is preferably such materials as synthetic resin materials enumerated by polyphenylene sulfide (PPS), polyacetal (POM), polyarylate (PAR), polyimide 6, polyamide 66, polyethylene terephthalate (PET), polybutylene terephthalate (PBT), ultra-high molecular weight polyethylene (UHMW-PE) or high molecular weight polyethylene (HMW-PE).

Figure 4:
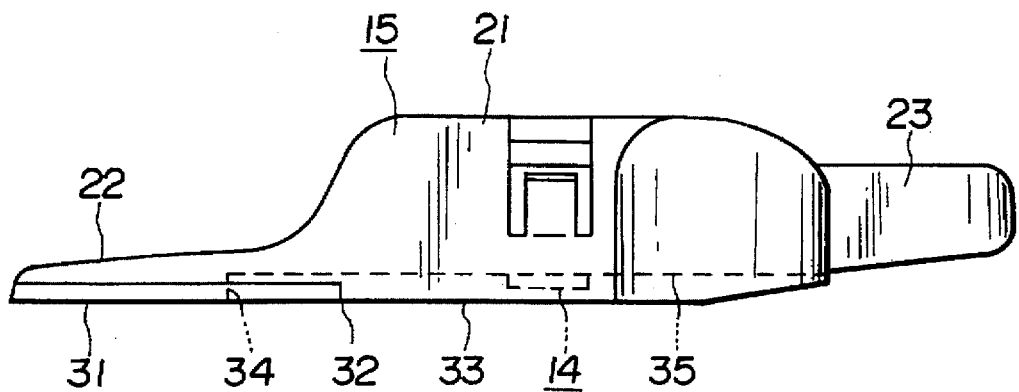
FIG. 4 is a side view showing a slide contact member of the magnetic head according to the present invention.

The slide contact member 15 has a head mounting portion 21 at a mid portion thereof for mounting the magnetic head element 14, as shown in FIGS. 2 to 4. A slide contact portion 22 for having a sliding contract with the magneto-optical disc is protuberantly formed at an end of the head mounting portion 21. On the opposite side of the head mounting portion 21 with respect to its side carrying the slide contact portion 22 is protuberantly formed an abutment 23 configured for controlling the rotational position with respect to the head support 16 of the slide contact member 15 which is abutted against a rotational position control arm 56 for being rotationally deflected about the second resilient flexible portions 18, 18 as center when the slide contact member 15 is turned along with the head support 16 in a direction away from the magneto-optical disc.

Figure 5:
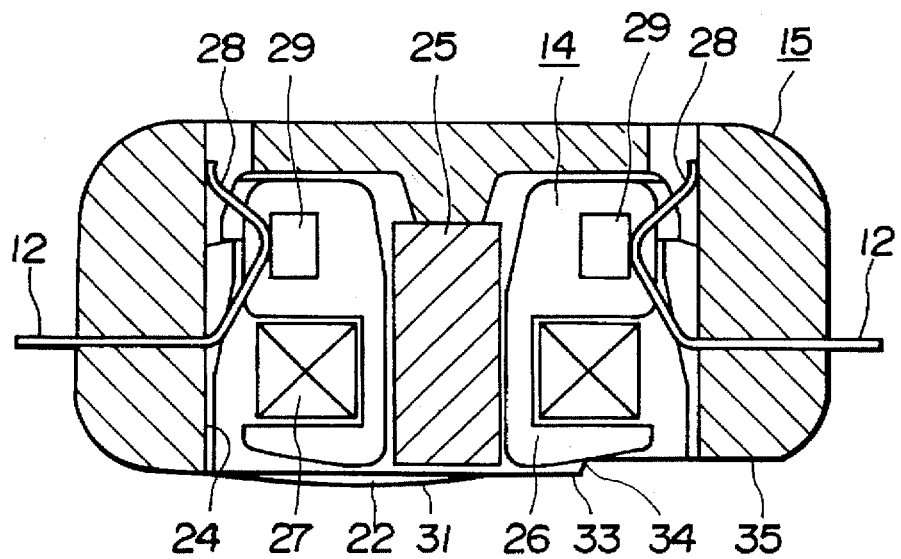
FIG. 5 is a transverse sectional view of the slide contact member.

The head mounting portion 21 has a head mounting opening 24 opening on its surface facing the magneto-optical disc as shown in FIG. 5. The magnetic head element 14 is mounted in the head mounting portion 21 by being inserted into the head mounting opening 24 at the opening end. The magnetic head element 14 mounted therein is made up of a magnetic core 25, a bobbin 26 mounted by being fitted on the magnetic core 225 and a coil 27 mounted on the bobbin 26, as shown in FIG. 5. Within the head mounting opening 24, feed terminals 28, 28 extended from the electrically conductive terminals 12, 12 are formed protuberantly. When the magnetic head element 14 is mounted within the head mounting opening 24, the coil connection terminals 29, 29 provided on the bobbin 26 are contacted with the feed terminals 28, 28, so that the coil 27 may be electrically connectable with the external circuit via the elastic members 12, 12 having the feed terminals 28, 28.

Figure 6:
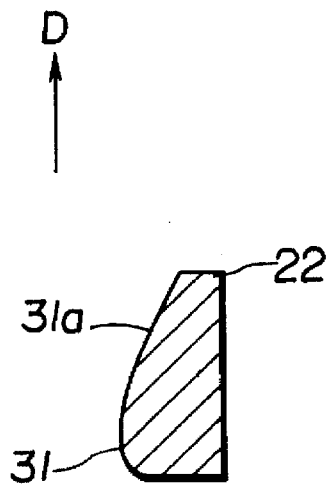
FIG. 6 is a cross-sectional view of the slide contact portion formed on the slide contact member.

The slide contact portion 22, having a sliding contact with the magneto-optical disc, has its slide contact surface 31 for the magneto-optical disc protuberantly formed with respect to the remaining potions so as to operate as a reference slide contact surface, as shown in FIGS. 4 and 5. As shown in FIG. 6, the slide contact surface 31 has an inclined surface 31a along the direction of movement on the magneto-optical disc when the slide contact member 15 is in sliding contact with the magneto-optical disc, that is, in the direction indicated by arrow D, or along the outer periphery of the disc. The inclined surface 31a assures smooth sliding contact of the slide contact portion 22 with the magneto-optical disc as the slide contact surface 31 of the slide contact portion 22 is moved in sliding contact with the rotated magneto-optical disc.

The head mounting portion 21 is connected to the slide portion 22 via a first shoulder 32, while the surface of the head mounting portion 21 facing the magneto-optical disc is formed with a first slide contact clearance 33 which is lower by one step than the slide contact surface 31 of the slide portion 22. The first slide contact clearance 33 is of such a depth as not to permit the distal end of the magnetic head element 14 mounted in the head mounting opening 24 to be protruded towards the magneto-optical disc.

The lateral side of the slide contact member 15 positioned on the outer peripheral side of the magneto-optical disc when the slide contact member 15 is moved on the magneto-optical disc is formed with a second slide contact clearance 35 via a second shoulder 34 deeper in step difference than the first shoulder 34.

Figure 7:
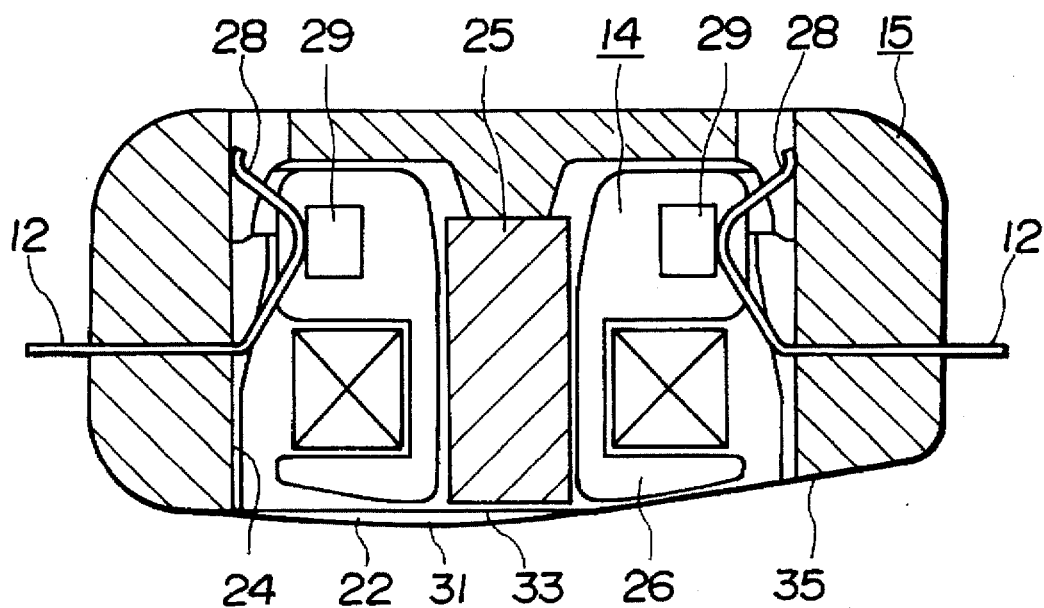
FIG. 7 is a transverse sectional view of a modification of the slide contact member.

The second slide contact clearance 35 may also be formed as a continuously inclined surface extending from the first slide contact clearance 33 towards a lateral side of the slide contact portion 15 without the interposition of the second shoulder 34, as shown in FIG. 7.

The slide contact member 15 thus formed is mounted on the head support 16 with the slide contact portion 22 positioned towards the first resilient flexible portions 17, 17 and with its both sides perpendicular to the direction of protrusion of the slide contact portion 22 being supported by the distal ends of the elastic members 12, 12, as shown in FIGS. 2 and 3. The supporting position of the slide contact member 15 by the elastic members 12, 12 is in the vicinity of the center of gravity of the slide contact member 15 which is at a mid portion of the contact member 15. Thus the magnetic head element 14 mounted on the head mounting portion 21 mounted in turn at a mid portion of the slide contact member 15 is positioned substantially in the vicinity of the center of rotation of the slide contact member 15 rotated with the second resilient flexible portions 18, 18 as the center of rotational deflection.

Figure 8:
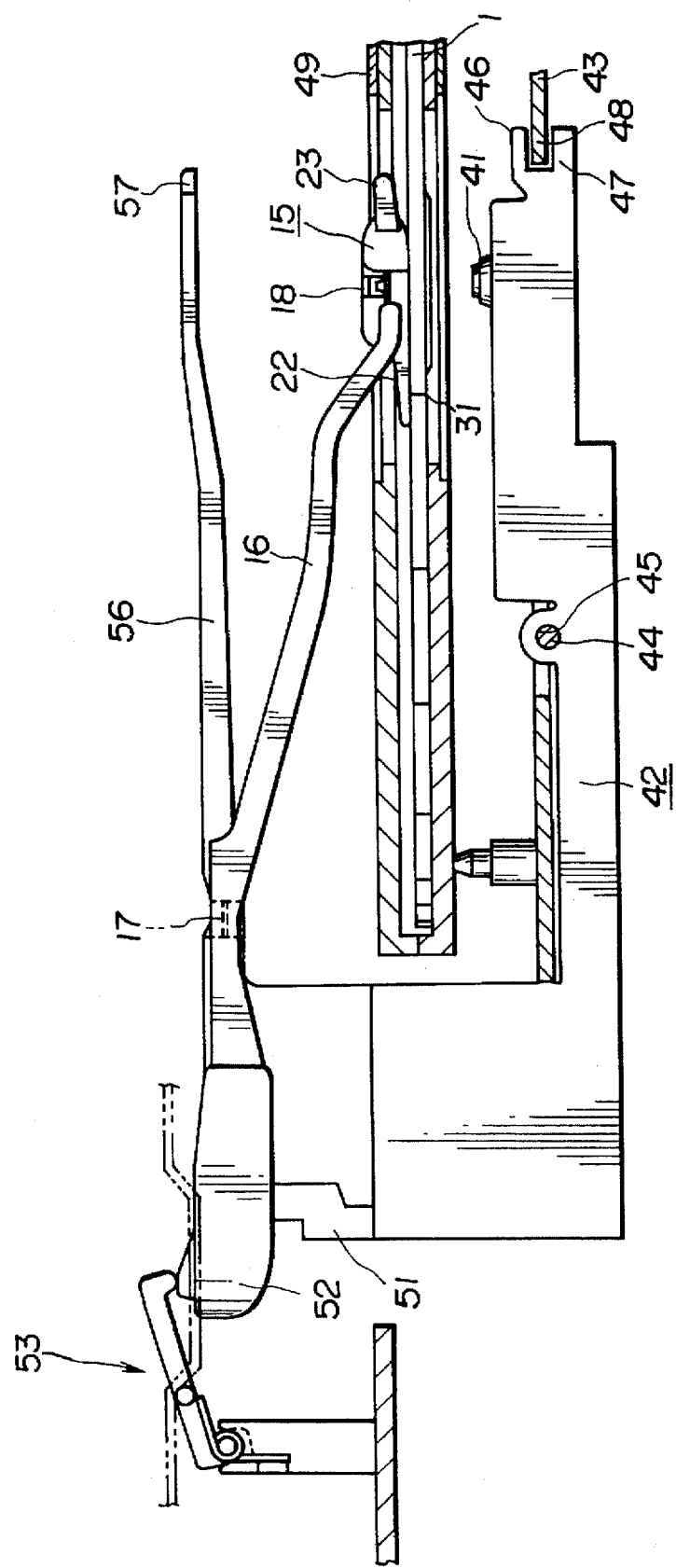
FIG. 8 is a cross-sectional view showing the relation between the magnetic head device according to the present invention and the magneto-optical disc loaded on the magneto-optical recording and/or reproducing apparatus.
Figure 9:
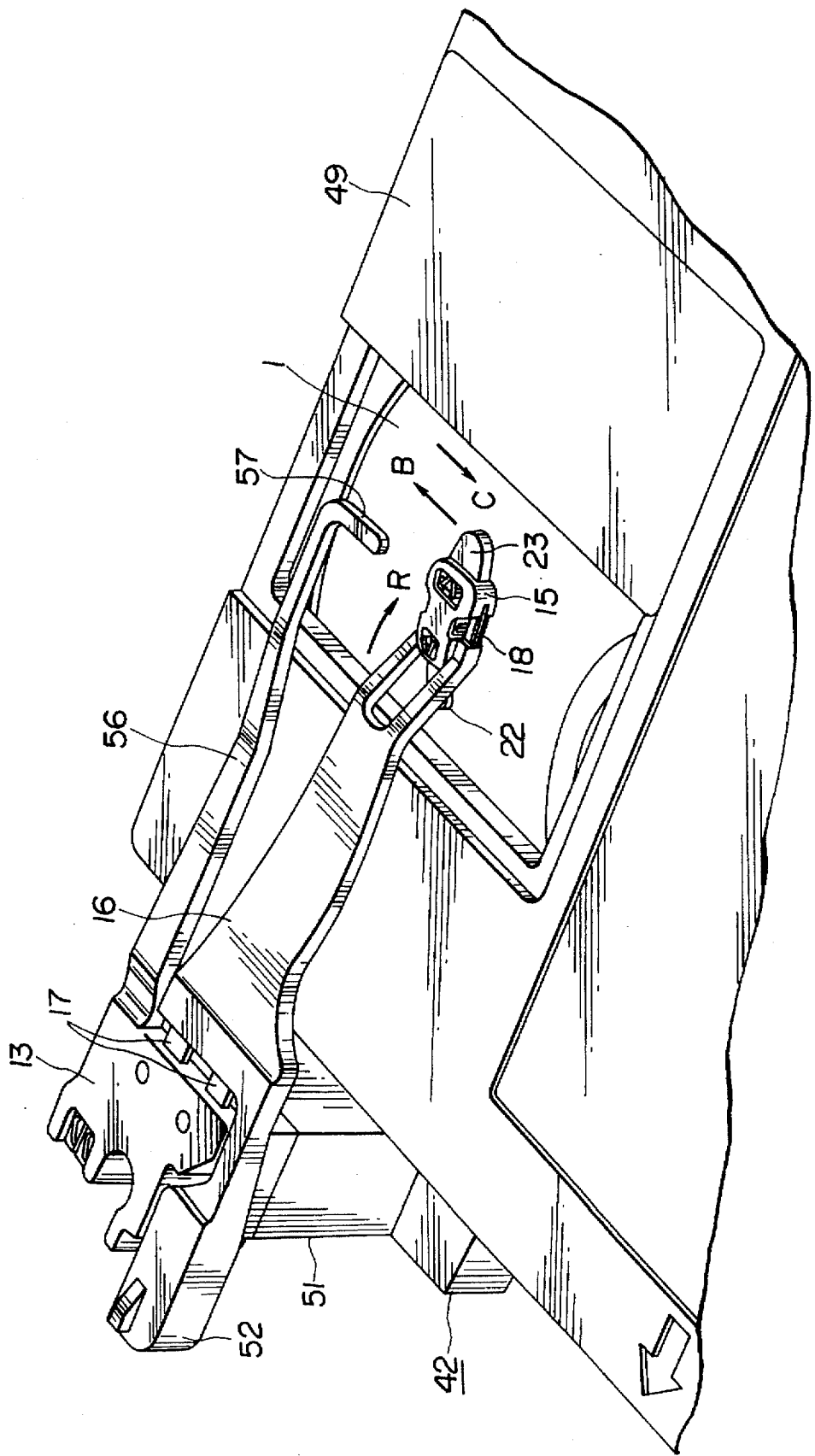
FIG. 9 is a perspective view showing the relation between the magnetic head device according to the present invention and the magneto-optical disc loaded on the magneto-optical recording and/or reproducing apparatus.

The above-described magnetic head device 11 is mounted on a movable base 42, carrying the optical pickup device 41 and movably mounted within the magneto-optical recording and/or reproducing apparatus, is mounted for movement in synchronism with the optical pickup device 41, as shown in FIGS. 8 and 9.

The movable base 42, carrying the magnetic head device 11 and the optical pickup device 41, is supported for movement along the radius of the magneto-optical disc 1 accommodated within the disc cartridge 4 loaded within the magneto-optical recording and/or reproducing apparatus as shown in FIG. 1, by introducing a slide guide shaft 44, mounted on a chassis base plate 43 carrying mechanical components such as disc rotating mechanism, into a through-hole 45 formed at a mid portion of the movable base 42 and by supporting a slide guide potion 48 provided on a side of the chassis base plate 43 by upper and lower engagement pieces 46, 47 provided on a side of the movable base 42. The movable base 42 is moved along the radius of the magneto-optical disc 1 by a pickup feed mechanism driven by a driving motor, not shown.

The optical pickup device 41 is mounted on the distal end of the movable base 42 with an objective lens condensing and illuminating the light beam outgoing from the light source on the magneto-optical recording layer of the magneto-optical disc 1 facing the magneto-optical disc 1. The optical pickup device 41 is mounted on the movable base 42 so that the optical axis of the objective lens is positioned on the centerline of the magneto-optical disc 1.

On the side of the movable base 42 opposite to the side thereof carrying the optical pickup 41 is upstandingly formed a mounting base 51 of the magnetic head device 1. The magnetic head device 11 is mounted on the movable base 42 by fixing the stationary portion 13 on the upper end of the mounting base 51 so that the head support 16 is extended on the disc cartridge 49 loaded on the cartridge loading unit, as shown in FIG. 8.

When the magnetic head device 11 is mounted on the mounting base 51, the center magnetic pole of the magnetic core 25 constituting the magnetic head element 14 mounted on the slide contact member 15 supported via the second resilient flexible portions 18, 18 on the distal end of the head support 16 faces the objective lens of the optical pickup device 41 with the magneto-optical disc 1 in-between for impressing an external magnetic field at a light beam illuminating position on the magneto-optical disc 1.

The magnetic head device 11, mounted on the mounting base 51, is fed along the radius of the magneto-optical disc 1 as indicated by arrows B and C in FIG. 9 in unison with the optical pickup 41 by the movable base 2 being driven by the pickup driving mechanism. That is, the direction of movement of the magnetic head device 11 with respect to the magneto-optical disc 1 is perpendicular to the longitudinal direction of the head support 16 and to the direction of rotational deflection having the second resilient flexible portions 18, 18 of the slide contact member 15 as the center of rotational deflection, as shown in FIG. 9. Thus the slide contact member 15 supported on the distal end of the head support 16 is moved in sliding contact with and along the radius of the magneto-optical disc 1 so that the second slide contact clearance 35 is positioned on the outer periphery of the magneto-optical disc 1.

The direction of rotation of the magneto-optical disc 1 is such a direction as proceeds from the distal end of the slide contact portion 22 formed at one end of the slide contact member 15 towards the magnetic head element 14, as indicated by arrow R in FIG. 9.

Since the magnetic head element 14 is mounted substantially in the vicinity of the center of rotation of the slide contact member 15, and the slide contact portion 22 having the slide contact surface 31 preferentially contacted with the major surface of the magneto-optical disc 1 is provided at one end of the slide contact member 15 protruded from the center of rotation along the direction of rotation of the magneto-optical disc 1, it becomes possible to suppress height variations of the magnetic head element 14 relative to the magneto-optical disc 1 even though the major surface of the magneto-optical disc 1 slidingly contacted by the slide contact member 15 of the magneto-optical disc 1 presents micro-irregularities such that the slide contact portion 22 is vertically oscillated and the slide contact member 15 is rotationally deflected about an axis extending between second resilient flexible portions 18, 18 as the center of rotational deflection. Thus it becomes possible to maintain the distance between the magnetic head element 14 and the magneto-optical disc 1 substantially at a constant value.

Since the first slide contact clearance 33 is formed at a level lower by one step from the slide contact surface 31 of the slide contact portion 22, the portions of the slide contact portion 22 other than the slide contact surface 31 may be prohibited from being slidingly contacted with the magneto-optical disc 1 even if the slide contact member 15 is rotationally deflected about the second resilient flexible portions 18, 18 as center, thus positively prohibiting the magnetic head element 14 from being partially contacted with the magneto-optical disc 1.

On the other hand, when the slide contact member 15 is moved towards the outer most periphery of the magneto-optical disc 1, the second slide contact clearance 35 formed on one side of the slide contact member 15 is positioned on the outer most peripheral side of increased thickness of the magneto-optical disc 1 so that the sliding contact member 15 may be prohibited from being floated from the signal recording region of the magneto-optical disc 1 while the slide contact portion 22 may be positively contacted with a sliding contact with the signal recording area of the magneto-optical disc 1. Thus the slide contact member 5 may be slidingly contacted with the magneto-optical disc 1 across the inner and outer rims of a region of the magneto-optical disc 1 capable of recording information signals, while a substantially constant distance may be maintained between the magnetic head element 14 and the magneto-optical disc 1.

Meanwhile, when the disc cartridge 29 housing the magneto-optical disc therein is loaded on or unloaded from the cartridge loading unit, the head support 16 is rotated about an axis extending between first resilient flexible portions 17, 17 as the center of rotation, as indicated by arrow A in FIG. 2, for detaching the slide contact member 15 from within the disc cartridge 49 for producing a spacing between it and the optical pickup device 41 sufficient to permit loading/unloading of the disc cartridge. This operation is performed by rotation of the rotating unit 52 extended towards the proximal side of the head support 16 by the head rotating mechanism 53 provided on the magneto-optical recording and/or reproducing apparatus.

When rotated by the head rotating mechanism 53, the head support 16 is rotated as far as the horizontal position parallel to the chassis base plate 43 within the magneto-optical recording and/or reproducing apparatus, that is substantially parallel to the magneto-optical disc 1 loaded on the cartridge loading unit. When the head support 16 is rotationally deflected as far as the horizontal position about the first resilient flexible portion 17, 17 as the center of rotational deflection, the abutment portion 23 provided on the distal end of the slide contact member 15 is abutted against the rotating position control unit 57 provided on the distal end of th rotational position control arm 56 extended from the stationary portion 13. The slide contact member 15 is rotationally deflected in a direction opposite to arrow A in FIG. 2, about the second resilient flexible portions 18, 18 as center, so as to be controlled to a rotational position thereof substantially parallel to the head support 16.

What is claimed is:

1. A magnetic head device for magneto-optical recording comprising:
    a magnetic head element having a magnetic core and a bobbin carrying a coil;
    a slide contact member carrying said magnetic head element and having a slide contact portion having sliding contact with a magneto-optical disc; and
    a head support supported for rotational deflection about a first axis by a movable base movably supported radially of the magneto-optical disc and carrying said slide contact member for rotational deflection at a distal end of the head support about a second axis, wherein the first axis and the second axis are parallel to both a recording surface of the magneto-optical disc and a direction of radial travel of the slide contact member over the magneto-optical disc;
    said slide contact member having said slide contact portion formed on one end thereof, a first slide contact clearance being formed on an outer periphery on a distal end of the magnetic head element facing the magneto-optical disc and a second slide contact clearance being formed on one lateral side thereof towards an outer periphery of said magneto-optical disc when the slide contact member is moved on said magneto-optical disc.

2. The magnetic head device for magneto-optical recording as claimed in claim 1 wherein said slide contact member is formed of a synthetic resin and said first slide contact clearance is protruded at least from the distal end of said magnetic head element.

3. The magnetic head device for magneto-optical recording as claimed in claim 1 wherein said magnetic head element is mounted at least on said slide contact member substantially in the vicinity of the center of rotation of said slide contact member.

4. The magnetic head device for magneto-optical recording as claimed in claim 1 wherein, in said slide contact portion of said slide contact member, said first slide contact clearance is formed one step lower in level than a reference slide contact surface and said second slide contact surface is formed further one step lower in level.

5. The magnetic head device for magneto-optical recording as claimed in claim 1 wherein said head support is supported by a stationary portion secured to said movable base via first resilient flexible portions for rotational deflection and wherein said head support supports said slide contact member on the distal end thereof via second resilient flexible portions for rotational deflection.

6. The magnetic head device for magneto-optical recording as claimed in claim 5 wherein said head support in the magnetic head device for magneto-optical recording is rotated in a direction away from the magneto-optical disc about the first resilient flexible portions as the center of rotation.

7. The magnetic head device for magneto-optical recording as claimed in claim 1 wherein said head support has a pair of electrically conductive plate-shaped members, one ends of which are electrically connected to said coil.

8. The magnetic head device for magneto-optical recording as claimed in claim 1 further comprising control means for controlling the rotational position of said slide contact member, said control means controlling the rotational position of the slide contact member supported on the distal end of the head support rotated in a direction of being detached from the magneto-optical disc.

9. A magnetic head device for magneto-optical disc comprising:
    a magnetic head element having a magnetic core and a bobbin carrying a coil;
    a slide contact member carrying said magnetic head element and having a slide contact portion having sliding contact with a magneto-optical disc; and
    a head support supported for rotational deflection about a first axis by a stationary portion secured to a movable base movably supported radially of the magneto-optical disc via first resilient flexible portions and carrying said slide contact member for rotational deflection about a second axis at a distal end of the head support via second resilient flexible portions wherein the first axis and the second axis are parallel to both a recording surface of the magneto-optical disc and a direction of radial travel of the slide contact member over the magneto-optical disc;
    said magnetic head element being mounted on said slide contact member substantially in the vicinity of the center of rotation of said slide contact member;
    said slide contact member having said slide contact portion on one end thereof, a first slide contact clearance being formed on an outer periphery on a distal end of the magnetic head element facing the magneto-optical disc so as to be protruded at least from the distal end of the magnetic head element and a second slide contact clearance being formed on one lateral side thereof towards an outer periphery of said magneto-optical disc when the slide contact member is moved on said magneto-optical disc.

10. The magnetic head device for magneto-optical recording as claimed in claim 9 wherein said slide contact member has said slide contact clearance lower by a further one step in level than said first slide contact clearance.

11. The magnetic head device for magneto-optical recording as claimed in claim 9 wherein said head support in the magnetic head device for magneto-optical recording is rotated in a direction away from the magneto-optical disc about the first resilient flexible portions as the center of rotation.

12. The magnetic head device for magneto-optical recording as claimed in claim 9 further comprising control means for controlling the rotational position of said slide contact member, said control means controlling the rotational position of the slide contact member supported on the distal end of the head support rotated in a direction of being detached from the magneto-optical disc.

13. A magneto-optical recording apparatus comprising:

a disc rotating mechanism for rotationally driving a magneto-optical disc loaded therein;

a movable base supported for movement radially of said magneto-optical disc;

an optical pickup device having an objective lens for radiating a beam outgoing from a light source to said magneto-optical disc, said optical pickup device being supported by said movable base for facing one major surface of the magneto-optical disc; and a magnetic head device having a magnetic head element, a slide contact member carrying said magnetic head element and having a slide contact portion having a sliding contact with the magneto-optical disc, and a head support supported for rotational deflection about a first axis by a movable base movably supported radially of the magneto-optical disc and carrying said slide contact member for rotational deflection about a second axis at a distal end of the head support, wherein the first axis and the second axis are parallel to both a recording surface of the magneto-optical disc and a direction of radial travel of the slide contact member over the magneto-optical disc;

said slide contact member having said slide contact portion on one end thereof, a first slide contact clearance being formed on the outer periphery on a distal end of the magnetic head element facing the magneto-optical disc and a second slide contact clearance being formed on one lateral side thereof towards the outer periphery of said magneto-optical disc when the slide contact member is moved on said magneto-optical disc.

14. The magneto-optical recording apparatus as claimed in claim 13 wherein said first slide contact clearance is protuberantly formed on at least a distal end of the magnetic head element.

15. The magneto-optical recording apparatus as claimed in claim 13 wherein said magnetic head element is mounted on said slide contact member substantially in the vicinity of the center of rotation of said slide contact member.

16. The magneto-optical recording apparatus as claimed in claim 13 wherein said head support is supported by a stationary portion secured to said movable base via first resilient flexible portions for rotational deflection and wherein said head support supports said slide contact member on the distal end thereof via second resilient flexible portions for rotational deflection.

17. The magneto-optical recording apparatus as claimed in claim 16 wherein said head support in the magnetic head device for magneto-optical recording is rotated in a direction away from the magneto-optical disc about the first resilient flexible portions as the center of rotation.

18. The magneto-optical recording apparatus as claimed in claim 13 wherein said head support has a pair of electrically conductive plate-shaped members, one ends of which are electrically connected to said coil.

19. The magneto-optical recording apparatus as claimed in claim 13 further comprising:

control means for controlling the rotational position of said slide contact member, said control means controlling the rotational position of the slide contact member supported on the distal end of the head support rotated in a direction of being detached from the magneto-optical disc.

* * * * *